(12) United States Patent
Deng et al.

(10) Patent No.: US 7,177,165 B2
(45) Date of Patent: Feb. 13, 2007

(54) SYSTEM AND METHOD FOR UNBALANCED INDEPENDENT AC PHASE VOLTAGE CONTROL OF A 3-PHASE, 4-WIRE OUTPUT DC/AC INVERTER

(75) Inventors: Duo Deng, Canton, MI (US);
Kon-King M. Wang, Canton, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 288 days.

(21) Appl. No.: 10/872,970

(22) Filed: Jun. 21, 2004

(65) Prior Publication Data

US 2005/0281067 A1    Dec. 22, 2005

(51) Int. Cl.
*H02M 7/44* (2006.01)
(52) U.S. Cl. ...................................... 363/40
(58) Field of Classification Search ................ 363/40, 363/95, 97, 131
See application file for complete search history.

(56) References Cited

U.S. PATENT DOCUMENTS

| 4,443,747 | A | * | 4/1984 | Chausse et al. ............. 318/723 |
| 5,032,974 | A | * | 7/1991 | Dohmstreich et al. ....... 363/148 |
| 5,361,196 | A | * | 11/1994 | Tanamachi et al. ........... 363/41 |
| 5,438,502 | A | * | 8/1995 | Rozman et al. ............... 363/35 |
| 5,467,262 | A | * | 11/1995 | Nakata et al. ................ 363/41 |
| 5,627,742 | A | * | 5/1997 | Nakata et al. ................ 363/98 |

* cited by examiner

*Primary Examiner*—Adolf Berhane
(74) *Attorney, Agent, or Firm*—Seed IP Law Group PLLC (57) ABSTRACT

Independent phase output voltage control for a 3-phase 4-wire DC/AC inverter, for example, is provided. With the independent phase output voltage control, all three phase output voltages from the DC/AC inverter can be separately and effectively controlled to provide balanced 3-phase voltages from the DC/AC inverter to an unbalanced load, and/or to provide unbalanced 3-phase voltages from the DC/AC inverter to a balanced or unbalanced load. The independent phase output voltage control method can be applied to an inverter power system, with outputs of N-phase (N+1) wire configurations. Here, N can be any integer number greater than zero.

40 Claims, 7 Drawing Sheets

SYSTEM AND METHOD FOR UNBALANCED INDEPENDENT AC PHASE VOLTAGE CONTROL OF A 3-PHASE, 4-WIRE OUTPUT DC/AC INVERTER

TECHNICAL FIELD

The present disclosure generally relates to electric power systems, and more specifically but not exclusively, relates to techniques to provide independent phase voltage control for power inverter systems operating under unbalanced conditions.

BACKGROUND INFORMATION

Electric power systems comprise subsystems that are used to transform and/or condition electrical power in a variety of applications. For example, DC/AC (DC to AC) power inverter systems are used to invert DC voltage/power to a suitable AC voltage/power, such as standard 50/60 Hz 380V/480V AC. DC/AC inverters are widely used in a variety of power implementations. For instance, power inverter systems may transform power from a standalone power source (such as an array of photovoltaic cells, fuel cell system, micro-turbine, or flywheel, and the like) for use in a standalone application and/or for export to, or by, a power grid.

Balanced (or symmetrical) phase voltages of a 3-phase power inverter comprise identical magnitude for each phase and a symmetrical 120° phase shift between any two phases under all load conditions. When a 3-phase DC/AC inverter is used as a power source, keeping the DC/AC inverter's three output phase voltages balanced is desirable because certain types of 3-phase loads (such as 3-phase motors, 3-phase transformers, and other types of loads) operate more efficiently with balanced input voltages.

In some applications, the 3-phase DC/AC inverter supplies an unbalanced 3-phase load. In such unbalanced load conditions, balanced output voltages from the DC/AC inverter may become unbalanced, because there is an internal impedance in the DC/AC inverter. 3-phase 3-wire DC/AC inverters have only two independent current paths, which make only two independently controllable phase voltages available. Thus, sufficient phase voltage control for a 3-phase 3-wire DC/AC inverter under unbalanced conditions is difficult. 3-phase 4-wire DC/AC inverters have three phase lines plus a neutral line that form independent current paths for each phase. A 3-phase 4-wire DC/AC inverter can thus be treated as three single-phase inverters. Because this topology is useful for balance control of the phase voltages, 3-phase 4-wire DC/AC inverters are widely used in unbalanced load applications.

Using a 3-phase 4-wire DC/AC inverter as a voltage source in unbalanced operations raises control issues with respect to achieving independent phase voltage control for the DC/AC inverter's 3-phase output voltages. Independent phase voltage control is advantageous so that the DC/AC inverter can deliver any required voltage for each phase to meet different applications. Delivering three balanced voltages at unbalanced load conditions is a common application. As mentioned above for unbalanced load conditions, balanced output voltages from the DC/AC inverter may become unbalanced due at least in part to the internal impedance in DC/AC inverters. Moreover, 3-phase load equipment (such as a 3-phase AC motor, 3-phase transformer, etc.) may have trouble operating with a voltage source that provides unbalanced phase voltages. For instance, unbalanced phase output voltages from a voltage source may cause a 3-phase motor to generate torque ripple or vibration. Keeping phase output voltages balanced during unbalanced operating conditions is a useful performance feature for a 3-phase 4-wire DC/AC inverter, but can be difficult to obtain.

Delivering three unbalanced phase voltages under balanced or unbalanced load conditions is another application of a 3-phase 4-wire DC/AC inverter, for example, for use as special power supplies as test equipment. 3-phase 4-wire DC/AC inverters are further used to handle severe unbalanced load operations where some load is applied in single phase, some load in two phases, and some load in three phases.

To obtain balanced output voltages for a DC/AC inverter under severe unbalanced load conditions and/or to provide unbalanced output voltages from a DC/AC inverter that are to be supplied to balanced or unbalanced loads, reliable independent phase voltage control is needed but is not adequately addressed by existing schemes.

BRIEF SUMMARY OF THE INVENTION

According to one aspect, a power system to provide power to a load comprises a multiple-phase power transformation device to provide phase output voltages. A voltage reference generator provides reference voltages usable to independently control corresponding ones of the phase output voltages provided by the power transformation device. A voltage control system is coupled to the voltage reference generator to receive the reference voltages therefrom and is coupled to the power transformation device to receive sensed voltages representative of the phase output voltages decoupled from each other. The voltage control system generates regulated voltages from the reference voltages and the sensed voltages. A signal generation unit is coupled to the voltage control system to receive the regulated voltages and is coupled to receive the reference voltages. The signal generation unit generates control signals based on the received regulated and reference voltages to control operation of the power transformation device to provide the phase output voltages.

According to another aspect, a power system comprises a DC/AC inverter to provide phase output voltages. A voltage control system coupled to the inverter receives sensed voltages on a stationary frame that are representative of the phase output voltages, the voltage control system being operable to provide regulated voltages corresponding to each phase of the inverter based on controllable reference voltages and on feedback from the sensed voltages on the stationary frame. A plurality of feed-forward controls is coupled to the voltage control system and corresponds to the phases of the inverter, the feed-forward controls being operable to provide control voltages, based on the regulated voltages from the voltage control system and on the reference voltages, that are usable to independently control the phase output voltages provided by the inverter.

According to yet another aspect, an apparatus usable in a multiple-phase power system comprises at least one voltage controller to provide independent phase output voltage control. The voltage controller comprises a first terminal to receive a first signal representative of a phase output voltage that is to be controlled and a second terminal to receive a second signal representative of the phase output voltage if independently controlled. The voltage controller further comprises a third terminal to provide a third signal derived from the received first and second signals. A feed-forward control coupled to the voltage controller provides a fourth signal, derived from the second and third signals, that is usable to control the phase output voltage.

According to still another aspect, a power system for providing power to a load comprises a means for providing multiple phase output voltages. A means for providing reference voltages is usable to independently set either or both magnitude and phase offset angle of each phase output voltage for unbalanced conditions. The power system comprises a control means for receiving sensed voltages representative of the phase output voltages decoupled from each other and for providing regulated voltages from the reference voltages and the sensed voltages, and a means for generating control signals, based on the regulated and reference voltages, that individually control the magnitude and phase offset angle of respective ones of the phase output voltages.

According to a further aspect, a method to provide independent phase output voltage control comprises receiving a first signal representative of a phase output voltage that is to be controlled independently of other phase output voltages under an unbalanced condition, comprising receiving the first signal decoupled from other first signals. The method comprises receiving a second signal representative of the phase output voltage if independently controlled in either or both magnitude and phase offset under the unbalanced condition, obtaining a third signal from the received first and second signals, and obtaining a fourth signal, from the second and third signals, that is usable to control the phase output voltage.

According to another aspect, an article of manufacture, usable for a power system that provides multiple phase output voltages, comprises a machine-readable medium comprising instructions stored thereon to cause a processor to independently control the phase output voltages, by: processing a first signal representative of a phase output voltage that is to be controlled independently of other phase output voltages under an unbalanced condition, the first signal being decoupled from other first signals; generating a second signal representative of the phase output voltage if independently controlled in either or both magnitude and phase offset under the unbalanced condition; obtaining a third signal from the first and second signals; and obtaining a fourth signal, from the second and third signals, that is usable to control the phase output voltage.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

As an overview, one embodiment provides a technique that uses hardware and/or software configurations to achieve independent output phase voltage control for a 3-phase 4-wire DC/AC inverter, for example. With the independent phase voltage control, all three output voltages from the DC/AC inverter can be separately and effectively controlled. One application for this independent output phase voltage control is to balance a 3-phase voltage output from a DC/AC inverter to an unbalanced load. Another application for this independent output phase voltage control is to supply unbalanced 3-phase voltages from a DC/AC inverter to a balanced or unbalanced load.

Figure 1:
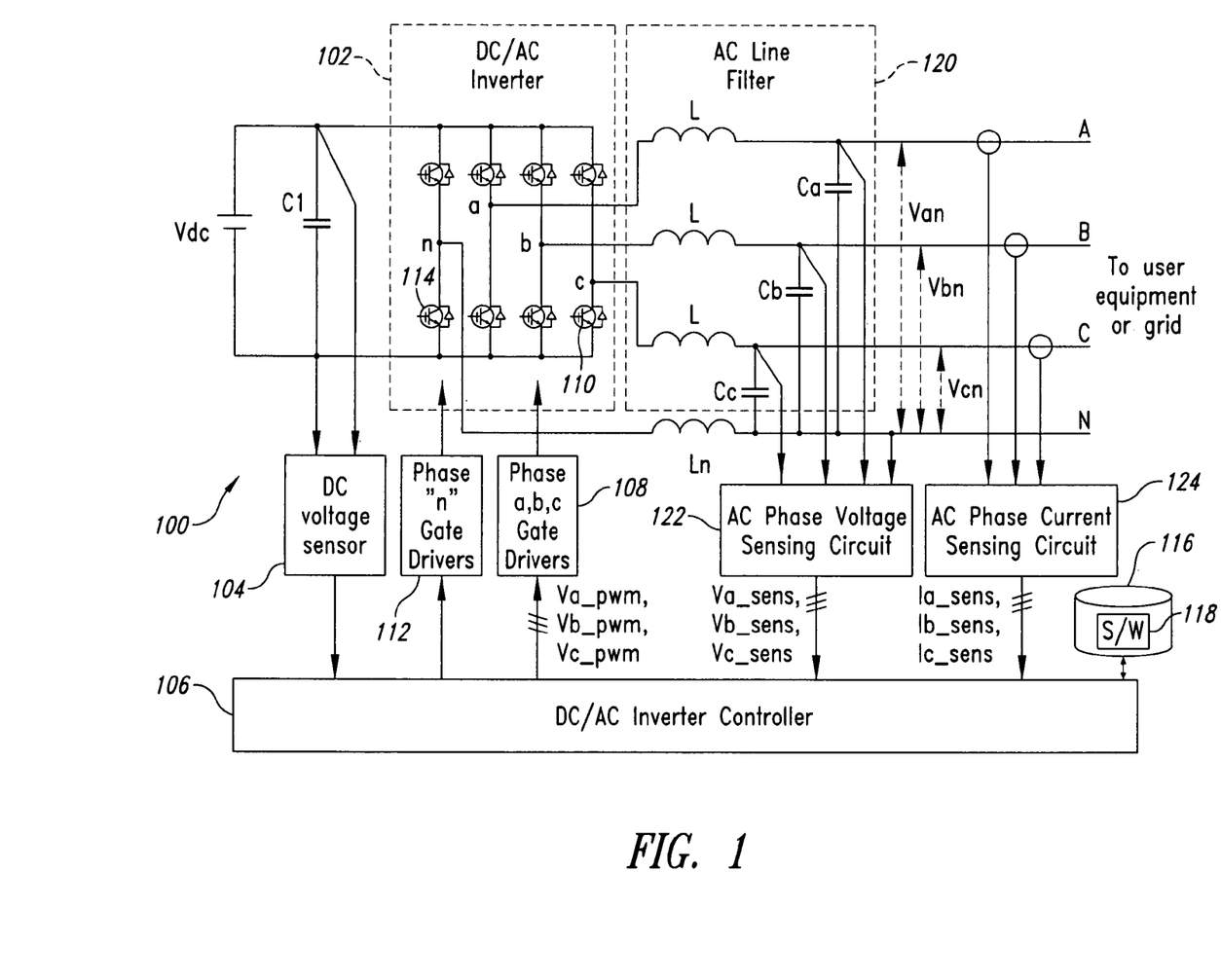
FIG. 1 is a schematic block diagram of a power system according to one embodiment.

FIG. 1 is a block diagram of an example power system 100 that can implement one embodiment to provide balanced output phase voltages to an unbalanced load and/or to provide unbalanced output phase voltages to a balanced or unbalanced load. The system 100 comprises a DC/AC inverter 102, which in an example embodiment comprises a 3-phase 4-wire output DC/AC inverter. That is, the DC/AC inverter 102 provides 3-phase output AC voltages respectively to three phase output lines A, B, and C, plus a neutral output line N, and these output lines in turn provide the AC voltage/power to user equipment, a power grid, or other load. On a DC-bus side of the DC/AC inverter 102, the system 100 comprises a DC voltage source Vdc (such as fuel cell array, photovoltaic cell array, battery, or other DC voltage source) coupled in parallel to a capacitor C1.

A DC voltage sensor 104 is coupled across the capacitor C1 to sense or otherwise determine the DC voltage output from the DC voltage source Vdc. The DC voltage sensor 104 is in turn coupled to a DC/AC inverter controller 106 to provide the sensed DC voltage thereto. The controller 106 can comprise one or more processors, microprocessors, controllers, application specific integrated circuits (ASICs), or other devices suitable for controlling operation of the DC/AC inverter 102 to invert DC voltages to AC voltages and/or to control other operations of the system 100. In one embodiment, the controller 106 is coupled to provide signals to phase A, B, C gate drivers 108 to control the switching of transistors 110 in the respective phase A, B, C circuitry in the DC/AC inverter 102. Such signals may be pulse width modulation (PWM) control signals, shown as signals Va_pwm, Vb_pwm, and Vc_pwm in FIG. 1. The controller 106 is further coupled to provide signals to phase N gate drivers 112 to control the switching of transistors 114 in the phase N circuitry in the DC/AC inverter 102.

In one embodiment, the system 100 comprises one or more machine-readable storage media 116. The storage medium 116 is coupled to the controller 106 to allow the controller 106 to access and execute software 118 stored thereon. The software 118 may comprise code, modules, or other types of machine-readable instructions that are executable by the controller 106 to provide independent output phase voltage control under unbalanced conditions.

Figure 2:
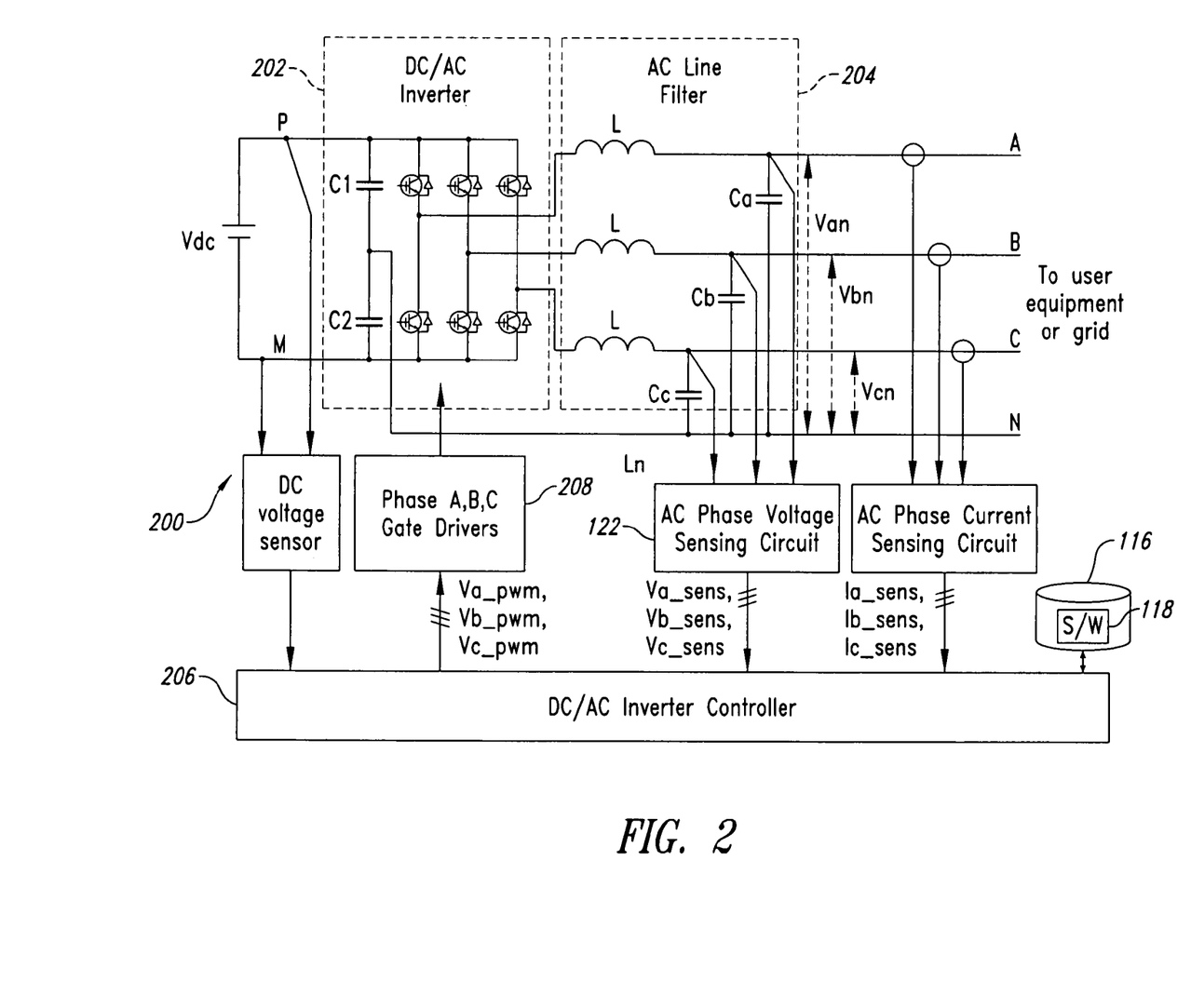
FIG. 2 is a schematic block diagram of a power system according to another embodiment.

On an AC-bus side of the DC/AC inverter 102, the system 100 comprises an AC line filter 120, which itself comprises inductors L and capacitors Ca, Cb, Cc provided for each phase A, B, C, respectively. The AC-bus side of the DC/AC inverter further comprises an inductor Ln for the neutral N. The AC phase-to-neutral voltages associated with each phase across the respective capacitors Ca, Cb, Cc (such as Van) are sensed or otherwise determined by an AC phase voltage sensing circuit 122. The voltage sensing circuit 122 is operatively coupled to the controller 106 to provide signals (shown as Va_sens, Vb_sens, and Vc_sens) representative of the sensed voltages to the controller 106 and/or to other circuitry. An AC phase current sensing circuit 124 is coupled to each of the phases A, B, C to sense or otherwise determine current in each phase, and is operatively coupled to the controller 106 to provide signals (shown as Ia_sens, Ib_sens, and Ic_sens) representative of the sensed currents to the controller 106 and/or other circuitry.

FIG. 2 is a block diagram of another example power system 200 that can implement one embodiment to provide balanced output phase voltages to an unbalanced load and/or to provide unbalanced output phase voltages to a balanced or unbalanced load. Similar to the system 100 of FIG. 1, the system 200 comprises 3-phase 4-wire output DC/AC inverter 202 on a DC-bus side and an AC line filter 204 on an AC-bus side. A difference between the system 200 and the system 100 is that the neutral line is coupled differently in the system 100 (e.g., the neutral line N is coupled between series capacitors C1 and C2 in the inverter 202). Moreover, separate switching transistor circuitry for the neutral N is not used in the inverter 202, thereby dispensing with the need for separate phase N gate drivers. A DC/AC inverter controller 206 of the system provides PWM control voltages to phase A, B, C gate drivers 208, and performs other control operations.

In one embodiment, the controller 206 is similar to the controller 106 of FIG. 1, and therefore, various control operations will be described hereinafter in the context of the controller 106 for the sake of simplicity of explanation. It is understood that the control functions described herein for the controller 106 can be adapted to the controller 206 by a person skilled in the art having the benefit of this disclosure. The system 200 has other similarities and differences in operation, circuitry, and configuration as compared to the system 100. Such other similarities and differences will not be described in further detail herein for the sake of brevity.

To better understand features of embodiments of the applicants' independent voltage control schemes, a discussion of other voltage control schemes will be presented first herein. Starting initially with FIG. 3, an example of an AC voltage control scheme for 3-phase DC/AC inverters or 3-phase 4-wire DC/AC inverters is shown. The voltage control scheme of FIG. 3 adopts feed-forward plus feedback controls on a synchronous frame.

A synchronous frame a-b-c/d-q-n transformation block 300 is used in this scheme to convert 3-phase AC output voltages on a stationary frame (e.g., an a-b-c frame) to d-q-n voltages. With this a-b-c/d-q-n transformation, the 3-phase AC output voltages from a DC/AC inverter are used as three input AC feedback voltages (Va_fbk, Vb_fbk, Vc_fbk of 50/60 Hz frequency) into the block 300, with appropriate phase θ being provided by a phase angle generator 302. The block 300 converts the AC feedback voltages Va_fbk, Vb_fbk, Vc_fbk into two DC voltages (Vd_fbk and Vq_fbk) plus a neutral component (Vn_fbk). For a balanced 3-phase voltage system, the transformation of the block 300 generates the two DC voltages Vd_fbk and Vq_fbk as outputs and a zero voltage output for the neutral component Vn_fbk. Because the neutral component Vn_fbk always equals zero for a balanced 3-phase voltage system, n-axis voltage control is not needed and therefore is not present in the scheme of FIG. 3.

Figure 3:
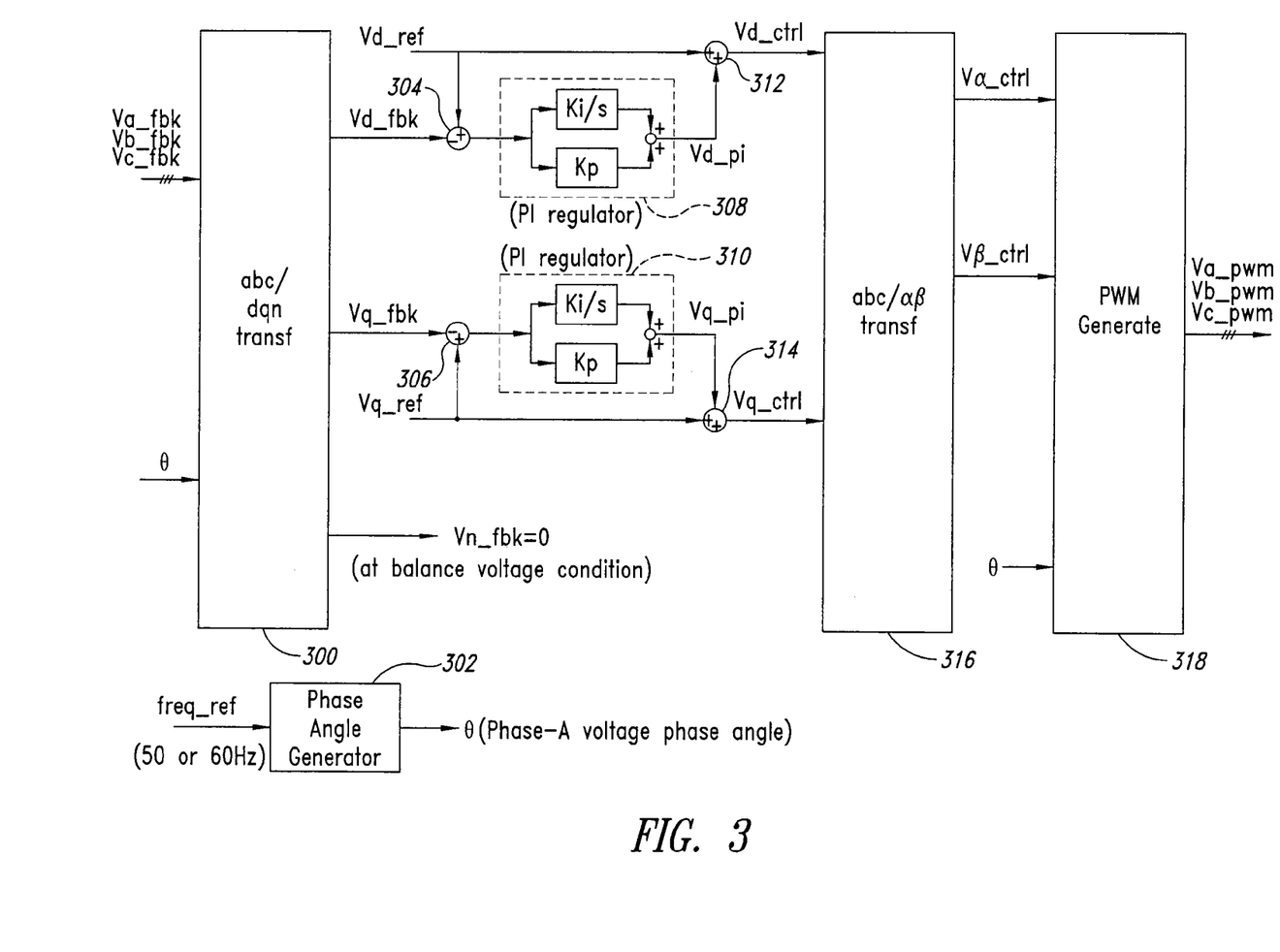
FIG. 3 is a block diagram of a voltage control technique.

The DC voltages Vd_fbk and Vq_fbk are compared with DC d-q reference voltages Vd_ref and Vq_ref, respectively at comparators 304 and 306. The output of the comparators 304 and 306 are respectively provided to feedback voltage controllers 308 and 310, which in this example comprise proportional integrator voltage regulators. The voltage controllers 308 and 310 respectively output d-q voltages Vd_pi and Vq_pi.

The feed-forward d-q reference voltages Vd_ref and Vq_ref are combined with the d-q voltages Vd_pi and Vq_pi, respectively at summers 312 and 314 to form resultant control voltages Vd_ctrl and Vq_ctrl. The two control voltages Vd_ctrl and Vq_ctrl obtained from the regulation on the synchronous frame are transformed back to two AC voltages Vα_ctrl and Vβ_ctrl by a 2-axis (α-β) stationary frame depicted by a block 316. The voltages Va_ctrl and Vβ_ctrl from the block 316 are used as control inputs (along with the phase θ) for a PWM generator 318, which provides appropriate Va_pwm, Vb_pwm, Vc_pwm signals for gate drivers for generating 3-phase voltages at outputs of a DC/AC inverter. If the DC/AC inverter has a balanced load, then the scheme of FIG. 3 works well.

Figure 4:
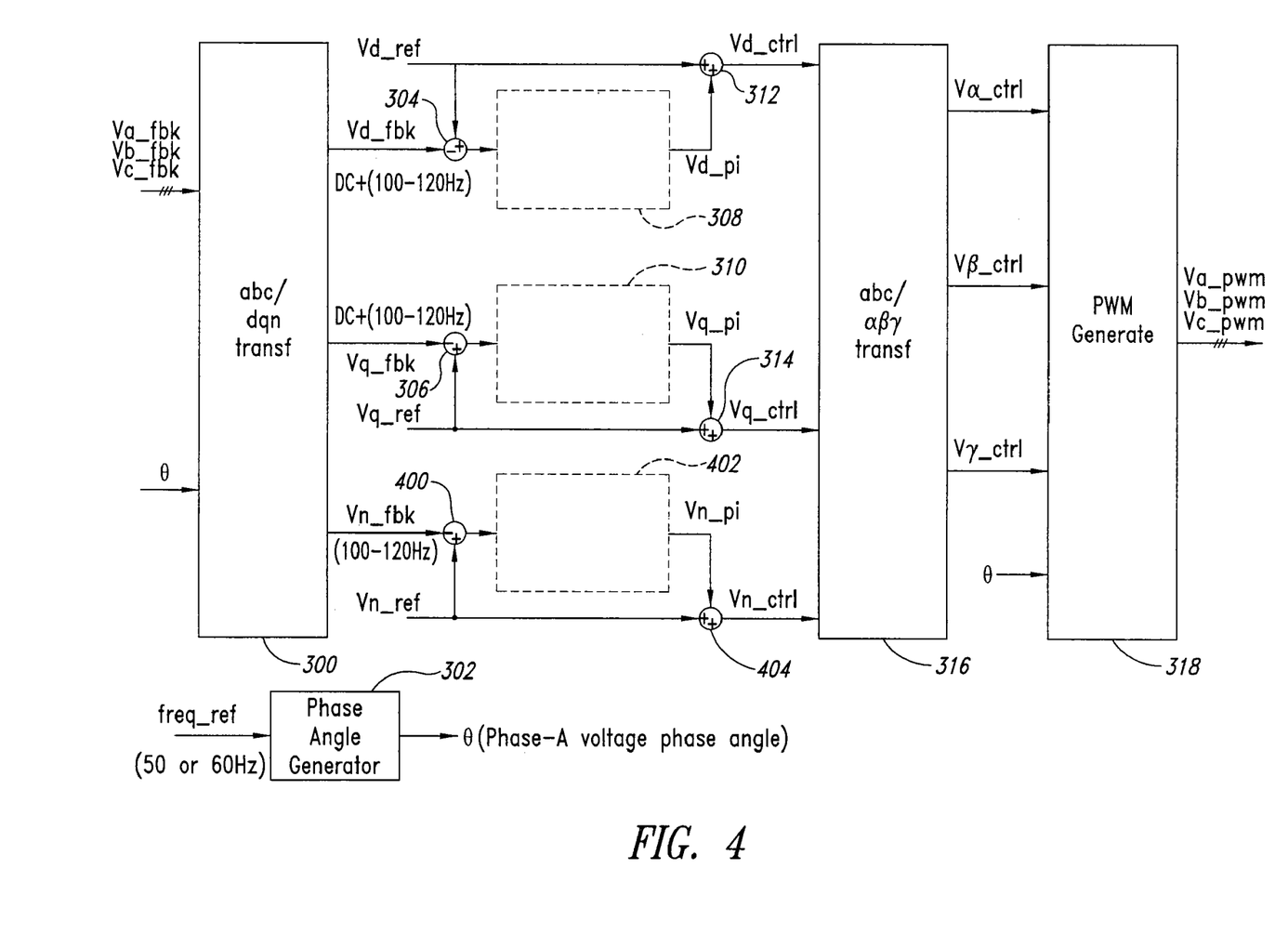
FIG. 4 is a block diagram of another voltage control technique.

However, in some situations, the DC/AC inverter needs to supply balanced phase voltages to an unbalanced load. In other situations, the DC/AC inverter needs to supply unbalanced 3-phase voltages to a balanced or unbalanced load. With these situations, the 3-phase AC feedback voltages Va_fbk, Vb_fbk, Vc_fbk are not balanced. FIG. 4 shows a control scheme on a synchronous frame (e.g., a d-q-n frame depicted by the transformation block 300) that is used for independent 3-phase voltage control of a DC/AC inverter. The transformation block 300 receives the unbalanced AC feedback voltages Va_fbk, Vb_fbk, Vc_fbk, along with phase 0 from the phase angle generator 302.

After the a-b-c/d-q-n transformation by the block 300, the voltages Vd_fbk and Vq_fbk are not DC voltages, and the neutral component Vn_fbk is not zero voltage. The neutral component Vn_fbk is compared with a reference voltage Vn_ref at a comparator 400, whose output is provided to a voltage controller 402. The voltage controller 402 outputs Vn_pi, which is summed with a feed-forward reference voltage Vn_ref at a summer 404 to produce a control voltage Vn_ctrl. The control voltage Vn_ctrl is transformed by the block 316 to a control voltage Vγ_ctrl, which is used as one of the control inputs into the PWM generator 318, along with the Vα_ctrl and Vβ_ctrl voltages.

If the DC/AC inverter outputs 50 Hz or 60 Hz phase voltages, then there are 100 Hz or 120 Hz components (i.e., double frequency components) in the d-q feedback voltages Vd_fbk and Vq_fbk, and the neutral component Vn_fbk is a non-zero 50 Hz or 60 Hz AC voltage on the synchronous frame. The double frequency components in the voltages Vd_fbk and Vq_fbk come from the a-b-c stationary frame and represent the coupling of three unbalanced phase voltages on the synchronous frame.

To obtain accurate phase voltage control in magnitude and phase, the voltage controller 402 should have a bandwidth of at least 10 times higher than 100 Hz or 120 Hz (i.e., a bandwidth greater than 1 kHz or 1.2 kHz). As another consideration, to obtain noise immunity from the switching operation of a DC/AC inverter, the bandwidth of the voltage controllers 308 and 310 should be much less than the switching frequency used in the DC/AC inverter. For example, if the DC/AC inverter has a switching frequency of 5 kHz, the phase voltage controllers 308 and 310 may need to have bandwidths of less than 1 kHz in order to be immune from interference due to switching noise. The inconsistent requirements of a bandwidth greater than 1 kHz or 1.2 kHz for the n-axis phase voltage controller 402 for accurate phase voltage control and less than 1 kHz for noise immunity for the voltage controllers 308 and 310 make the scheme of FIG. 4 infeasible or inadequate for satisfactory phase voltage control. Moreover, the control scheme on the synchronous frame in FIG. 4 has limitations in independent phase voltage control for DC/AC inverters with low switching frequency, and may be particularly limited in the context of high-power DC/AC inverters, which usually have lower switching frequencies as compared to other types of DC/AC inverters.

Special filters can be used to filter the double frequency components in the d-q axis feedback voltages Vd_fbk and Vq_fbk and to obtain the DC form of controllers 308, 310. However, it is very difficult to completely eliminate double frequency components and to keep the desired performance of the fundamental frequency component in dynamic and steady states by using relatively simple filters, and it is not practical to adopt complex filter schemes to perform the filtering since such filtering schemes use substantial computing time and/or resources. That is, it is undesirable for processors or controllers for real-time AC phase voltage control to spend significant time performing high-order filterings. Accordingly, some voltage control schemes, such as those in FIGS. 3–4, often leave residue double frequency components in the outputs of the voltage controllers 308 and 310 when practical filters (e.g., not high order filters) are used in the scheme. The residue double frequency components degrade not only the harmonic performance of output phase voltages, but also degrade the control quality of independent phase voltage control for a DC/AC inverter. Therefore, true independent phase voltage control is difficult to obtain by using the scheme of synchronous frame of FIG. 4.

Additionally, the n-axis voltage controller 402 controls AC voltages with a frequency of 50 Hz or 60 Hz, for example. Consequently, the AC voltage controller cannot be avoided in an independent phase voltage control system.

Figure 5:
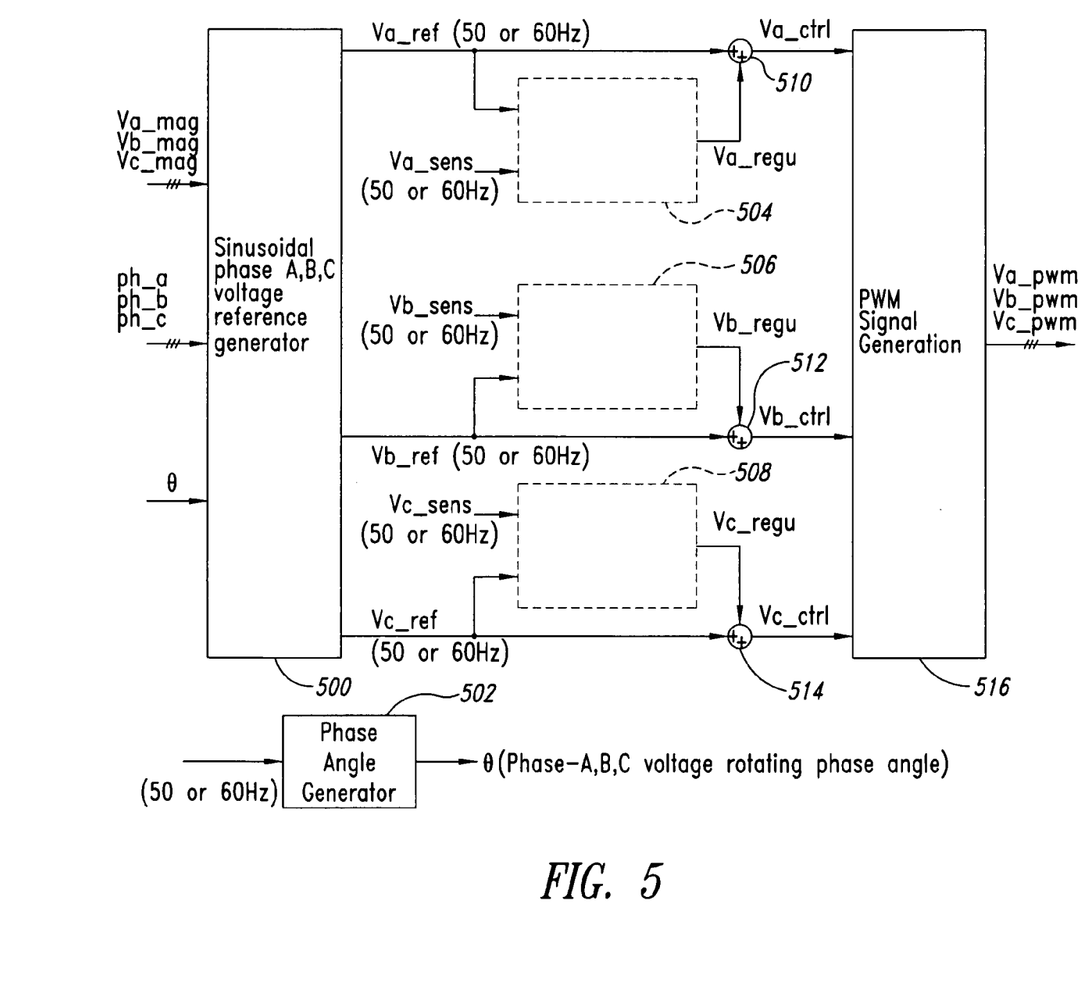
FIG. 5 is a block diagram of one embodiment of a voltage control technique that can be implemented in the systems of FIGS. 1 and 2.

FIG. 5 shows one embodiment of a control system or other scheme for independent 3-phase voltage control for the 3-phase DC/AC inverters 102 and 202 of FIGS. 1–2. The voltage control scheme of FIG. 5 adopts feed-forward plus feedback controls, but in contrast to the schemes of FIGS. 3–4, on a stationary frame. The stationary frame is depicted by a block 500 in FIG. 5, which generates sinusoidal phase reference voltages Va_ref, Vb_ref, and Vc_ref.

On the stationary frame, reference voltages Va_ref, Vb_ref, and Vc_ref and feedback voltages Va_sens, Vb_sens, and Vc_sens (from the voltage sensing circuit 122 of FIGS. 1–2) comprise AC voltages, at 50 Hz or 60 Hz for example. Because the a-b-c to d-q-n transformation of FIGS. 3–4, which creates a coupling of feedback phase voltages on a synchronous frame, is not present in the voltage control scheme of FIG. 5, the feedback voltages Va_sens, Vb_sens, and Vc_sens maintain their decoupled format on the stationary frame. The three reference voltages Va_ref, Vb_ref, and Vc_ref comprise independent variables that can be set in terms of magnitude and phase on the stationary frame, thereby providing independent phase voltage control for a 3-phase voltage control system.

In the embodiment of FIG. 5, the block 500 generates the reference voltages Va_ref, Vb_ref, and Vc_ref based on the following equations:

$Va\_ref = Va\_mag * \sin(\theta + pha)$ $Vb\_ref = Vb\_mag * \sin(\theta - 2/3\pi + phb)$ $Vc\_ref = Vc\_mag * \sin(\theta + 2/3\pi + phc).$ In the above equations, Va_mag, Vb_mag, and Vc_mag represent voltage magnitude, and pha, phb, and phc represent offset phase angles for phase A, B, and C voltages, respectively. In one embodiment, when the DC/AC inverters 102 or 202 are used as balanced voltage sources, Va_mag, Vb_mag, and Vc_mag are at least substantially identical, and pha, phb, and phc are at least substantially equal to zero. When the DC/AC inverters 102 or 202 are used as unbalanced voltage sources, one embodiment allows Va_mag, Vb_mag, and Vc_mag to be specified or otherwise set (by a user, for example) with different magnitude values and allows pha, phb, and phc to be set with different non-zero offset values.

The rotating phase angle θ generated by a block 502 can have the following format:

$\theta = \int (2\pi * freq\_ref) * dt$, wherein freq_ref is a reference frequency, such as 50 Hz or 60 Hz.

The voltage magnitudes Va_mag, Vb_mag, and Vc_mag, the offset phase angles pha, phb, and phc, and the phase angle θ are all provided as inputs to the block 500, which generates the reference voltages Va_ref, Vb_ref, and Vc_ref respectively therefrom. The reference voltages Va_ref, Vb_ref, and Vc_ref and the feedback voltages Va_sens, Vb_sens, and Vc_sens are respectively provided to voltage controllers 504, 506, and 508.

The voltage controllers 504, 506, and 508 respectively output voltages Va_regu, Vb_regu, and Vc_regu. The voltages Va_regu, Vb_regu, and Vc_regu plus feed-forward reference voltages Va_ref, Vb_ref, and Vc_ref are respectively summed at summing nodes 510, 512, and 514, to respectively form control voltages Va_ctrl, Vb_ctrl, and Vc_ctrl. The three control voltages Va_ctrl, Vb_ctrl, and Vc_ctrl are used by a block 516 to generate corresponding PWM control signals Va_pwm, Vb_pwm, and Vc_pwm.

The block 516 comprises a signal generation unit that is coupled to or comprises part of the controller 106 to allow the controller 106 to provide the PWM signals Va_pwm, Vb_pwm, and Vc_pwm for each respective phase of the gate drivers 108 or 208, thereby providing independent phase voltage control for the 3-phase DC/AC inverters 102 or 202.

In one embodiment of the voltage control scheme of FIG. 5, each of the voltage controllers 504, 506, and 508 control an individual AC phase voltage. There is no control coupling among phase voltages, in contrast to the voltage control schemes of FIG. 3 or 4. Moreover, the three voltage controllers 504, 506, and 508 control AC voltages with frequency 50 Hz or 60 Hz, for example, which is half of the frequency (100 Hz or 120 Hz) of the voltages controlled by the scheme of FIG. 4. Accordingly, the bandwidth requirements for the voltage controllers 504, 506, and 508 of FIG. 5 are reduced to at least half of those in FIG. 4. With increased bandwidth margin for the voltage controllers 504, 506, and 508 of FIG. 5, the noise immunity performance is enhanced in comparison to the voltage control scheme of FIG. 4, and/or there is more flexibility in the voltage control scheme of FIG. 5 to enhance voltage control accuracy with increasing voltage controller bandwidth.

As an illustrative example, to meet accurate phase voltage control requirements, the bandwidth of the voltage controllers 504, 506, and 508 should be greater than 600 Hz (i.e., a bandwidth of at least 10 times 60 Hz rather than 10 times 120 Hz, for example, since double frequency components are generally not produced in the voltage control scheme of FIG. 5, as compared to generation of 120 Hz double frequency components in the voltage control scheme of FIG. 4). To meet noise immunity requirements, the bandwidth of the voltage controllers 504, 506, and 508 should be less than 1 kHz, assuming that the DC/AC inverter 102 or 202 has a 5 kHz switching frequency. Therefore, the bandwidth of the voltage controllers 504, 506, and 508 can be selected in the range of 600 Hz to 1000 Hz to meet bandwidth criteria for both voltage control and noise immunity.

As described above with reference to FIGS. 1–2, the voltage sensing circuit 122 is used to sense or otherwise detect the phase output voltages of the DC/AC inverter 102 or 202, and to send the voltages representative of the detected phase output voltages (i.e., Va_sens, Vb_sens, and Vc_sens) to the controller 106 and/or other circuitry. For instance, the voltages Va_sens, Vb_sens, and Vc_sens also comprise the feedback voltages that are provided for the voltage control scheme of FIG. 5.

Figure 6:
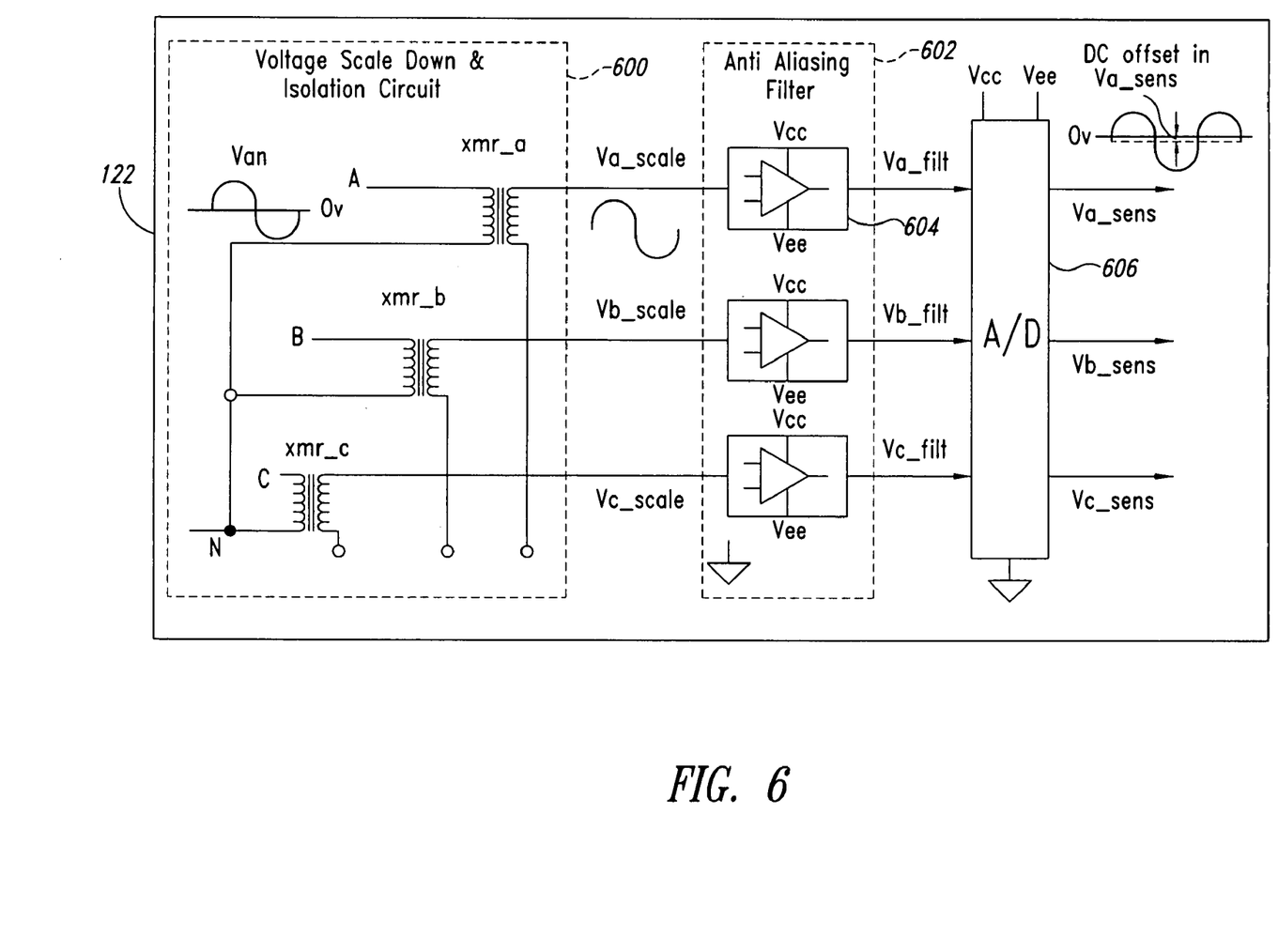
FIG. 6 is a schematic block diagram of one embodiment of a voltage sensing circuit that can be used in conjunction with the voltage control technique of FIG. 5.

FIG. 6 shows one embodiment of the voltage sensing circuit 122 in further detail. In addition to sensing the phase output voltages from the DC/AC inverter 102 or 202, the voltage sensing circuit 122 is used for scaling the sensed phase output voltages down to a voltage level at which the controller 106 or other electronic circuitry (such as the voltage controllers 504, 506, and 508) operate, which may be at a lower voltage level relative to the phase output voltages. Additionally, the voltage sensing circuit 122 operates as an isolation device between the output terminals of the DC/AC inverter 102 or 202 and the input terminals of the feedback circuitry. As an isolation device, the voltage sensing circuit 122 prevents possible high voltage spikes from reaching the controller 106 or other electronic circuitry (such as the voltage controllers 504, 506, and 508) through a parasitic path, and also prevents common mode noise from the DC/AC inverter 102 or 202 from entering into the feedback circuit.

In the embodiment of FIG. 6, the voltage sensing circuit 122 comprises three single-phase transformers xmr_a, xmr_b, and xmr_c that are coupled to the lines A, B, C, and N of FIGS. 1-2. The transformers xmr_a, xmr_b, and xmr_c comprise part of scaling down and isolation circuitry 600 of the voltage sensing circuit 122. The transformers xmr_a, xmr_b, and xmr_c of the circuitry 600 respectively output scaled down voltages Va_scale, Vb_scale, and Vc_scale.

Output terminals of the circuitry 600 are coupled to input terminals of an anti-aliasing filter 602. According to one embodiment, the anti-aliasing filter 602 comprises three operational amplifiers 604 powered by Vcc and Vee. Each of the operational amplifiers 604 is respectively coupled to receive the scaled down voltages Va_scale, Vb_scale, and Vc_scale, and operate to filter high-frequency components from these voltages, thereby resulting in filtered voltages Va_filt, Vb_filt, and Vc_filt.

Output terminals of the anti-aliasing filter 604 are coupled to input terminals of an A/D converter 606 to provide the input filtered voltages Va_filt, Vb_filt, and Vc_filt thereto. The A/D converter 606 outputs the voltages Va_sens, Vb_sens, and Vc_sens to the voltage controllers 504, 506, and 508, respectively, of FIG. 5.

In certain instances, a small DC offset voltage exists at the output of one embodiment of the voltage sensing circuit 122, even if pure sinusoidal voltages (e.g., Van) are applied to the input terminals of the sensing circuit 122 at the transformers xmr_a, xmr_b, and xmr_c. The DC offset voltage may be attributable to at least one of the following:

A. When the operational amplifiers 604 are used in the anti-aliasing filter 602 of the voltage sensing circuit 122, a DC offset voltage may be added in the AC feedback voltage (e.g., Va_sens) because operational amplifiers usually have a small input/output DC offset;

B. When the A/D converter 606 is used in the voltage sensing circuit 122, a DC offset voltage may be introduced into the A/D conversion because the zero reference voltage of the A/D converter 606 usually has a small DC offset; and/or C. There are usually tolerance errors for electronic devices that can cause an offset DC voltage in the AC feedback voltages.

As depicted illustratively in FIG. 6, there is no DC component for the phase voltage Van that is input into the voltage sensing circuit 122. Similarly, the scaled down voltage Va_scale from the isolation transformer xmr_a has no DC component. However, the sensed phase voltage Va_sens output from the sensing circuit 122 has a DC offset component, since the electronic devices (e.g., the operational amplifier 604 and/or the A/D converter 606) add DC offset to the sensed phase voltage.

The DC offset voltage generated in the voltage sensing circuit 122 can affect voltage control quality. This DC offset voltage can enter into the voltage controllers 504, 506, and 508 of FIG. 5, and cause their respective output voltages Va_regu, Vb_regu, and Vc_regu to have a DC offset. If the voltages Va_regu, Vb_regu, and Vc_regu have DC offset components, then the voltages Va_ctrl, Vb_ctrl, and Vc_ctrl will have DC offset components that will cause the phase output voltages from the DC/AC inverter 102 or 2C2 to have DC offset components.

Figure 7:
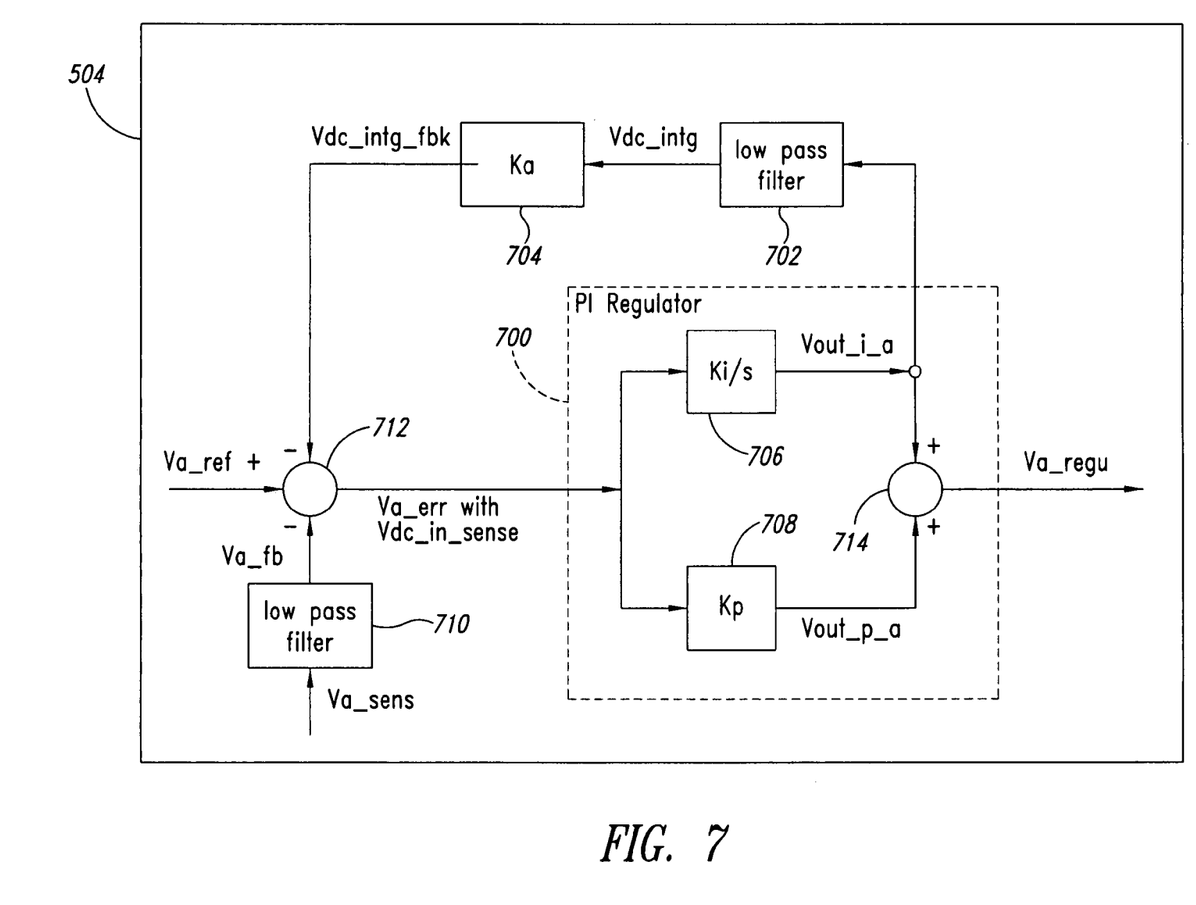
FIG. 7 is a block diagram illustrating DC offset elimination and voltage regulation components for the voltage control technique of FIG. 5 according to one embodiment.

FIG. 7 shows one embodiment of the voltage controller 504 that operates to eliminate the DC offset voltage generated by the voltage sensing circuit 122. For the sake of brevity, only the configuration for the voltage controller 504 for phase A is shown and described herein. The voltage controllers 506 and 508 for the other phases can be similarly configured. In the embodiment of FIG. 7, the voltage controller 504 comprises a proportional integrator (PI) voltage regulator 700 that is used to regulate a 50 Hz or 60 Hz, for example, AC output phase voltage of the DC/AC inverter 102 or 202. One embodiment of the voltage regulator 700 comprises an integrator block 706 and a proportional block 708. DC offset voltage elimination control is provided by adding a feedback path comprising blocks 702 and 704 between output and input terminals of the block 706 of the voltage regulator 700.

The voltage controller 504 comprises a first input terminal to receive the reference voltage Va_ref, such as a 50 Hz or 60 Hz sinusoidal input signal that represents a desired target phase A output voltage of the DC/AC inverter 102 or 202. The voltage controller 504 further comprises a second input terminal to receive a feedback phase voltage Va_fb, which may also be a 50 Hz or 60 Hz sinusoidal signal, for instance, if the DC/AC inverter 102 or 202 operates with these frequencies. In one embodiment, the feedback phase voltage Va_fb may be provided by way of a low pass filter 710 (which can comprise part of the voltage controller 504 or can be separate therefrom) that is coupled an output terminal of the A/D converter 606 of FIG. 6. The low pass filter 710 filters high-frequency ripple that may exist in the sensed phase voltage Va_sens, and obtains the feedback phase voltage Va_fb as a result. As discussed above, the phase voltage Va_sens may contain a DC offset component contributed by the voltage sensing circuit 122, and therefore, the resulting feedback phase voltage Va_fb may also contain a DC offset component.

At a node 712, a voltage Va_err is generated, which represents a voltage error or difference between the reference voltage Va_ref and the feedback phase voltage Va_fb. If a small DC offset voltage is present in the sensed phase voltage Va_sens and in the corresponding feedback phase voltage Va_fb, then the voltage Va_err will also have the DC offset voltage (denoted as Vdc in_sense in FIG. 7).

According to one embodiment, the voltage regulator 700 comprises the integrator block 706 with gain Ki and the proportional block 708 with gain Kp. Both of the blocks 706 and 708 comprise an input terminal to receive the voltage Va_err. The block 706 comprises an output terminal to output a voltage Vout_i_a, and the block 708 comprises an output terminal to output a voltage Vout_p_a. The sum of the voltages Vout_i_a and Vout_p_a at a node 714 is the voltage Va_regu, which is subsequently summed with the voltage Va_ref as shown in FIG. 5 to provide the appropriate control signal Va_ctrl for PWM generation.

It is noted that if both the voltages Va_ref and Va_fb are ideal sinusoidal signals, then the voltage Va_err is a sinusoidal signal without a DC component, and the voltage Va_regu is also a sinusoidal signal without a DC component. If the voltage Va_err has a DC offset component attributable to the voltage sensing circuit 122, then the voltage Va_regu will also have the DC offset component, which will further appear in the output phase voltage of the DC/AC inverter 102 or 202, unless eliminated beforehand.

Therefore, according to one embodiment, the voltage controller 504 further comprises the block 702, which may be embodied as a low pass filter with a very low cutoff frequency, such as 1 Hz, for example. The block 702 comprises an input terminal coupled to the output terminal of the block 706 to receive the voltage Vout_i_a therefrom. If the voltage Vout_i_a is a 50 Hz or 60 Hz AC signal without a DC component, then an output voltage Vdc_intg of the block 702 is substantially zero, due to the low cutoff frequency of the low pass filter. If the voltage Vout_i_a has a DC component, then the output voltage Vdc_intg from the block 702 comprises a DC signal that is substantially equal to the DC component in the voltage Vout_i_a. Thus, the block 702 operates as a DC voltage detector.

An output terminal of the block 702, which provides the output voltage Vdc_intg, is coupled to an input terminal of the block 704. The block 704 of one embodiment comprises an amplifier with a gain Ka. The block 704 has an output terminal coupled to the node 712 to provide a feedback voltage Vdc_intg_fbk with negative sign to the node 712.

The voltage Vdc_intg_fbk is used in this feedback structure to provide the DC offset elimination. For example, if there is a DC offset voltage (i.e., Vdc_in_sense) existing in the voltage Va_err input into the block 706, then the voltage Vout_i_a output from the block 706 will start to drift, and the voltages Vdc_intg and Vdc_intg_fbk in the feedback path will also drift. When the voltage Vdc_intg_fbk becomes equal to the voltage Vdc_in_sense at the input terminal of the block 706, the drift process will stop, since at this point the sum of Vdc_in_sense−Vdc_intg_fbk=0 at the input terminal of the block 706. Because the blocks 706 and 708 share common inputs, the DC offset at the output terminal of the block 708 will also be zero (i.e., the voltage Vout_p_a will have no DC offset).

The DC offset in the voltage Vout_i_a output from the block 706 can also be eliminated. If the gain Ka of the block 704 is greater than 1.0, the DC offset of the voltage Vout_i_a will be less than Vdc_in_sense. The DC offset of the voltage Vout_i_a can therefore be controlled to a negligible level by selecting Ka>>1.0. The voltage Va_regu output from the phase A voltage controller 504, which comprises a sum of Vout_i_a and Vout_p_a, will thus have substantially no DC offset component.

It can be seen from the above-described embodiments that control complexity is advantageously reduced, thereby resulting in cost savings. Substantially true independent phase voltage control is achieved by one embodiment by eliminating control coupling among the voltage phases, thereby providing balanced 3-phase voltage generation at severe unbalanced load conditions, and/or providing unbalanced 3-phase voltage generation at dynamic and steady states for balanced or unbalanced loads. One embodiment further provides phase voltage control accuracy and noise immunity enhancements.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For instance, the foregoing detailed description has set forth various embodiments of the devices and/or processes via the use of block diagrams, schematics, and examples. Insofar as such block diagrams, schematics and examples contain one or more functions and/or operations, it will be understood by those within the art that each function and/or operation within such block diagrams, schematics, or examples can be implemented, individually and/or collectively, by a wide range of hardware, software, firmware, or virtually any combination thereof.

For example, the above-described features of the various embodiments can be implemented in software or other machine-readable instructions stored on a machine-readable medium and executable by a processor. In the context of FIGS. 1–2, for instance, the software 118 stored on the storage medium 116 can be executed by the controller 106 (or other processor) to cause the controller 106 to independently control phase voltages under unbalanced conditions.

Additionally, various embodiments have been described with reference to specific operating frequency values, specific voltage values, or other specific circuit characteristics. It is appreciated that such specific details are provided herein merely for the purpose of explanation and illustration, and are not intended to be limiting. Furthermore, various embodiments have been described in the context of a 3-phase 4-wire system that comprises a DC/AC inverter. It is appreciated that various other embodiments may be implemented to provide independent phase voltage control for multi-phase systems that may have more or fewer than three phases. Such embodiments may also be implemented for systems that do not comprise a DC/AC inverter but instead comprise some other type of power transformation device or none at all, and which would benefit from having independent phase voltage control.

While some signals have been referred to as voltages herein, embodiments may employ any signal indication of magnitude and/or direction of the corresponding voltage, current, power, etc. The use of voltage labels herein is for illustrative purposes.

These and other modifications can be made to the invention in light of the above detailed description. The terms used in the following claims should not be construed to limit the invention to the specific embodiments disclosed in the specification and the claims. Rather: the scope of the invention is to be determined entirely by the following claims, which are to be construed in accordance with established doctrines of claim interpretation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A power system to provide power to a load, the power system comprising:
   a multiple-phase power transformation device to provide phase output voltages;
   a voltage reference generator to provide reference voltages usable to independently control corresponding ones of the phase output voltages provided by the power transformation device;
   a voltage control system, coupled to the voltage reference generator to receive the reference voltages therefrom and coupled to the power transformation device to receive sensed voltages representative of the phase output voltages decoupled from each other, to generate regulated voltages from the reference voltages and the sensed voltages; and
   a signal generation unit, coupled to the voltage control system to receive the regulated voltages and coupled to receive the reference voltages, to generate control signals based on the received regulated and reference voltages to control operation of the power transformation device to provide the phase output voltages.

2. The power system of claim 1 wherein the power transformation device comprises a DC/AC inverter.

3. The power system of claim 2 wherein the DC/AC inverter comprises a 3-phase 4-wire output DC/AC inverter.

4. The power system of claim 1 wherein the voltage control system comprises for each phase:
   a voltage regulator to receive an error voltage representative of a difference between a reference voltage and a sensed voltage and to generate a regulated voltage for that phase; and
   a feedback loop coupled between the voltage regulator and an input terminal of the voltage control system to substantially eliminate a DC offset component that may be present in the error voltage.

5. The power system of claim 4 wherein the voltage regulator comprises a proportional integrator voltage regulator comprising an integrator block and a proportional block, both the integrator and proportional blocks comprising input terminals to receive the error voltage and output terminals to provide respective output signals that can be summed to obtain the regulated voltage for the phase.

6. The power system of claim 5 wherein the feedback loop comprises:
   a filter comprising an input terminal coupled to the output terminal of the integrator block to pass a DC offset component that may be present in the output signal of the integrator block; and
   a gain block comprising an input terminal coupled to an output terminal of the filter to receive the DC offset component passed by the filter and to apply a negative gain thereto to obtain a feedback voltage, the gain block comprising an output terminal coupled to the input terminal of the voltage control system to allow the feedback voltage to be applied to the sensed voltage of the phase to substantially eliminate the DC offset component that may be present in the error voltage.

7. The power system of claim 4, further comprising a filter coupled to the input terminal of the voltage control system to remove high-frequency ripple that may be present in the sensed voltage for the phase.

8. The power system of claim 1, further comprising a voltage sensing circuit coupled between the power transformation device and the voltage control system to sense the phase output voltages provided by the power transformation device and to generate the sensed voltages representative thereof.

9. The power system of claim 8 wherein the voltage sensing circuit comprises:
   a first circuit coupled to the power transformation device to scale down the phase output voltages and to isolate high voltage values that may be present in the phase output voltages from the voltage control system;
   a second circuit coupled to the first circuit to receive the scaled down phase output voltages therefrom and to perform anti-aliasing filtering on the scaled down phase output voltages; and
   a converter coupled to the second circuit to convert the scaled down phase output voltages to corresponding sensed voltages.

10. The power system of claim 9 wherein the first circuit comprises a transformer for each phase to perform the scale down and isolation.

11. The power system of claim 1 wherein the reference voltages each comprise a magnitude and a phase offset angle that can be set to substantially equal value and substantially zero, respectively, to control the power transformation device to provide substantially balanced phase output voltages to an unbalanced load.

12. The power system of claim 1 wherein the reference voltages each comprise a magnitude and a phase offset angle that can be set to different values to control the power transformation device to provide unbalanced phase output voltages to either or both an unbalanced load and a balanced load.

13. A power system, comprising:
a DC/AC inverter to provide phase output voltages;
a voltage control system coupled to the inverter to receive sensed voltages on a stationary frame that are representative of the phase output voltages, the voltage control system operable to provide regulated voltages corresponding to each phase of the inverter based on controllable reference voltages and on feedback from the sensed voltages on the stationary frame; and
a plurality of feed-forward controls coupled to the voltage control system and corresponding to the phases of the inverter, the feed-forward controls operable to provide control voltages, based on the regulated voltages from the voltage control system and on the reference voltages, that are usable to independently control the phase output voltages provided by the inverter.

14. The power system of claim 13 wherein the feed-forward controls corresponding to the phases of the inverter comprise summing nodes to respectively sum regulated voltages for each phase from the voltage control system with the reference voltages for each phase, and to generate the control voltages from the summed voltages.

15. The power system of claim 13 wherein the voltage control system comprises a voltage controller for each phase, the voltage controller comprising:
a voltage regulator to receive an error voltage representative of a difference between a reference voltage and a sensed voltage and to generate a regulated voltage for that phase; and
a feedback circuit coupled between the voltage regulator and an input terminal of the voltage control system to substantially eliminate a DC offset component that may be present in the error voltage.

16. The power system of claim 15 wherein the feedback circuit comprises:
a first block comprising an input terminal coupled to a terminal of the voltage regulator to pass a DC offset component that may be present in a signal provided by the voltage regulator; and
a second block comprising an input terminal coupled to an output terminal of the first block to receive the DC offset component passed by the first block and to apply a gain thereto to obtain a feedback voltage, the second block further comprising an output terminal coupled to the input terminal of the voltage control system to allow the feedback voltage to be applied to the sensed voltage of the phase to substantially eliminate the DC offset component that may be present in the error voltage.

17. The power system of claim 13, further comprising:
a first circuit coupled to the inverter to scale down the phase output voltages and to isolate high voltage values that may be present in the phase output voltages from the voltage control system;
a second circuit coupled to the first circuit to receive the scaled down phase output voltages therefrom and to perform anti-aliasing filtering on the scaled down phase output voltages; and
a converter coupled to the second circuit to convert the scaled down phase output voltages to corresponding sensed voltages.

18. The power system of claim 13, further comprising:
a reference voltage generator coupled to the voltage control system and to the feed-forward controls to provide the reference voltages thereto, the reference voltage generator operable to allow a magnitude and a phase offset angle of each reference voltage to be set wherein:
the magnitude and phase offset angle of each reference voltage can be set to substantially equal value and substantially zero, respectively, to control the inverter to provide substantially balanced phase output voltages to an unbalanced load; and
the magnitude and phase offset angle of each reference voltage can be set to different values to control the inverter to provide unbalanced phase output voltages to either or both an unbalanced load and a balanced load.

19. The power system of claim 13, further comprising a DC voltage source coupled to the inverter to provide DC voltages thereto.

20. An apparatus usable in a multiple-phase power system, the apparatus comprising:
at least one voltage controller to provide independent phase output voltage control, the voltage controller comprising a first terminal to receive a first signal representative of a phase output voltage that is to be controlled and a second terminal to receive a second signal representative of the phase output voltage if independently controlled, the voltage controller further comprising a third terminal to provide a third signal derived from the received first and second signals; and
a feed-forward control coupled to the voltage controller to provide a fourth signal, derived from the second and third signals, that is usable to control the phase output voltage.

21. The apparatus of claim 20 wherein any one of the first, second, third, and fourth signals comprise voltage signals.

22. The apparatus of claim 20 wherein the voltage controller further comprises:
a regulator to receive a fifth signal representative of a difference between the first and second signals and to generate the third signal; and
a feedback loop coupled to the regulator and to the first terminal of the voltage controller to substantially eliminate a DC offset component that may be present in the fifth signal.

23. The apparatus of claim 22 wherein the regulator comprises a proportional integrator regulator comprising an integrator block and a proportional block, both the integrator and proportional blocks comprising input terminals to receive the fifth signal and output terminals to provide respective output signals that can be combined to obtain the third signal.

24. The apparatus of claim 22 wherein the feedback loop comprises:
a first block comprising an input terminal coupled to a terminal of the regulator to pass a DC offset component that may be present in an output signal provided by the regulator; and
a second block comprising an input terminal coupled to an output terminal of the first block to receive the DC offset component passed by the first block and to apply a gain thereto to obtain a feedback signal, the second block further comprising an output terminal coupled to the first terminal of the voltage controller to allow the feedback signal to be applied to the first signal to substantially eliminate the DC offset component that may be present in the fifth signal.

25. The apparatus of claim 20, further comprising a sensing circuit to sense the phase output voltage and comprising isolation circuitry, the isolation circuitry operable to scale down the phase output voltage to allow the scaled down phase output voltage to be filtered and converted into the first signal.

26. The apparatus of claim 20, further comprising:
a signal generator coupled to the voltage controller and to the feed-forward control to provide the second signal, the signal generator operable to allow a magnitude and a phase offset angle of the second signal to be set wherein:
the magnitude and phase offset angle of the second signal can be set to substantially equal value as magnitudes of other second signals and substantially zero phase offset angle, respectively, to allow substantially balanced phase output voltages to be provided to an unbalanced load; and
the magnitude and phase offset angle of the second signal can be set to a different value and a different phase offset angle, as compared to the other second signals, to allow unbalanced phase output voltages to be provided to either or both an unbalanced load and a balanced load.

27. A power system for providing power to a load, the power system comprising:
a means for providing multiple phase output voltages;
a means for providing reference voltages usable to independently set either or both magnitude and phase offset angle of each phase output voltage for unbalanced conditions;
a control means for receiving sensed voltages representative of the phase output voltages decoupled from each other and for providing regulated voltages from the reference voltages and the sensed voltages; and
a means for generating control signals, based on the regulated and reference voltages, that individually control the magnitude and phase offset angle of respective ones of the phase output voltages.

28. The power system of claim 27 wherein the control means comprises:
a regulator means to generate the regulated voltages from error voltages derived from the reference voltages and sensed voltages; and
a feedback means for eliminating a DC offset component that may be present in either or both the error voltages and the regulated voltages.

29. The power system of claim 27, further comprising a means for sensing the phase output voltages, comprising means for providing isolation and scale down of the phase output voltages and for generating the sensed voltages from the scaled down phase output voltages.

30. The power system of claim 27, further comprising additional means in cooperation with the means for providing multiple phase output voltages, for providing power to the load.

31. A method to provide independent phase output voltage control, the method comprising:
receiving a first signal representative of a phase output voltage that is to be controlled independently of other phase output voltages under an unbalanced condition, comprising receiving the first signal decoupled from other first signals;
receiving a second signal representative of the phase output voltage if independently controlled in either or both magnitude and phase offset under the unbalanced condition;
obtaining a third signal from the received first and second signals; and obtaining a fourth signal, from the second and third signals, that is usable to control the phase output voltage.

32. The method of claim 31 wherein obtaining the fourth signal comprises summing the second and third signals to obtain the fourth signal that is usable to control phase voltage circuitry of a power transformation device.

33. The method of claim 31 wherein obtaining the third signal from the received first and second signals comprises:
filtering the first signal to remove ripple therefrom;
obtaining an error signal representative of a difference between the filtered first signal and the second signal;
regulating the error signal to produce first and second output signals;
filtering the first output signal to detect a DC offset component that may be present therein;
feeding the DC offset component back into the error signal; and
combining the first and second output signals to obtain the third signal with any DC offset voltage substantially eliminated therefrom.

34. The method of claim 31, further comprising:
scaling down the phase output voltage that is to be independently controlled;
isolating any high-voltage values that may be present in the phase output voltage that is to be independently controlled;
anti-aliasing filtering the scaled down phase output voltage; and
converting the filtered scaled down phase output voltage into the first signal.

35. The method of claim 31 wherein receiving the second signal representative of the phase output voltage if independently controlled in either or both magnitude and phase offset under the unbalanced condition comprises:
if providing substantially balanced phase output voltages to an unbalanced load, setting the magnitude and phase offset of the second signal to substantially equal value as magnitudes of other second signals and substantially zero phase offset, respectively; and
if providing unbalanced phase output voltages to either or both an unbalanced load and a balanced load, setting the magnitude and phase offset angle of the second signal to a different value and a different phase offset, as compared to the other second signals.

36. The method of claim 31, further comprising:
independently controlling the phase output voltage using a controller comprising a bandwidth several times greater in magnitude than a frequency of the first signal; and
simultaneously immunizing from noise by providing the controller with bandwidth less than a switching frequency used to generate the phase output voltage.

37. An article of manufacture usable for a power system that provides multiple phase output voltages, the article of manufacture comprising:
a machine-readable medium comprising instructions stored thereon to cause a processor to independently control the phase output voltages, by:
processing a first signal representative of a phase output voltage that is to be controlled independently of other phase output voltages under an unbalanced condition, the first signal being decoupled from other first signals;
generating a second signal representative of the phase output voltage if independently controlled in either or both magnitude and phase offset under the unbalanced condition;

obtaining a third signal from the first and second signals; and obtaining a fourth signal, from the second and third signals, that is usable to control the phase output voltage.

38. The article of manufacture of claim 37 wherein the instructions to cause the processor to independently control the phase output voltages by obtaining the third signal from the first and second signals comprise instructions to cause the processor to independently control the phase output voltages, by:

filtering the first signal to remove ripple therefrom;

computing an error signal representative of a difference between the filtered first signal and the second signal;

processing the error signal to produce first and second output signals;

filtering the first output signal to detect a DC offset component that may be present therein;

feeding the DC offset component back into the error signal; and combining the first and second output signals to obtain the third signal with any DC offset voltage substantially eliminated therefrom.

39. The article of manufacture of claim 37 wherein the machine-readable medium further comprises instructions stored thereon to cause the processor to independently control the phase output voltages, by:

scaling down the phase output voltage that is to be independently controlled;

anti-aliasing filtering the scaled down phase output voltage; and converting the filtered scaled down phase output voltage into the first signal.

40. The article of manufacture of claim 37 wherein the instructions to cause the processor to independently control the phase output voltages by generating the second signal comprise instructions to cause the processor to independently control the phase output voltages, by:

if providing substantially balanced phase output voltages to an unbalanced load, setting the magnitude and phase offset of the second signal to substantially equal value as magnitudes of other second signals and substantially zero phase offset, respectively; and if providing unbalanced phase output voltages to either or both an unbalanced load and a balanced load, setting the magnitude and phase offset angle of the second signal to a different value and a different phase offset, as compared to the other second signals.

* * * * *